United States Patent [19]

Stanley

[11] 4,262,818

[45] Apr. 21, 1981

[54] COIN DISPENSING APPARATUS INCLUDING GUIDE TUBE AND CAMS FOR RETAINING COINS IN THE GUIDE TUBE

[75] Inventor: Louis Stanley, Beverly Hills, Australia

[73] Assignee: Galexie Manufacturing Pty. Limited, Sydney, Australia

[21] Appl. No.: 33,625

[22] Filed: Apr. 26, 1979

[51] Int. Cl.³ ............................................. B65G 59/06
[52] U.S. Cl. ................................................... 221/296
[58] Field of Search ................. 133/2, 4 A; 221/296, 221/298, 276; 194/DIG. 11

[56] References Cited

U.S. PATENT DOCUMENTS

| 1,400,304 | 12/1921 | Mercer | 221/296 |
| 3,775,941 | 12/1973 | Bross | 221/298 X |
| 3,970,218 | 7/1976 | Lee | 221/296 X |

Primary Examiner—Stanley H. Tollberg
Attorney, Agent, or Firm—Ladas & Parry

[57] ABSTRACT

A coin dispensing apparatus adapted to dispense a selected number of coins includes a guide tube to receive a plurality of coins and a number of cams to engage several of the coins in the tube to selectively retain a particular coin within the tube to thereby allow lower coins to be dispensed from within the tube.

4 Claims, 5 Drawing Figures

COIN DISPENSING APPARATUS INCLUDING GUIDE TUBE AND CAMS FOR RETAINING COINS IN THE GUIDE TUBE

The present invention relates to dispensing apparatus and more particularly but not exclusively to coin dispensing apparatus for the pay-out mechanism of slot machines.

In slot machines an indexing apparatus locates a series of display wheels in predetermined positions, which combination of positions determines the pay-out for that particular single operation of the machine. Once the pay-out has been determined the coin dispensing apparatus is activated to release a set number of coins.

Conventional coin dispensing apparatus suffer several disadvantages in that during operation they have been known to jam or release an incorrect number of coins.

Also conventional dispensing apparatus are adapted to dispense only one object at a time, accordingly it is a disadvantage of these machines that it has to be operated several times if more than one object is required.

Accordingly it is the object of the present invention to ameliorate the above disadvantages.

There is disclosed herein a dispensing apparatus to dispense objects of generally uniform size, said apparatus comprising a generally vertical guide defining a passage to receive and store a plurality of the objects, object engaging means movable between a first position projecting into said passage and a second position not projecting into said passage, selection means to selectively move said engaging means between the two positions, and wherein the engaging means when in said first position is adapted to engage one of said objects and jam it within said guide to prevent movement of said one of said objects so that lower objects may be dispersed from within said guide while objects located above said one of said objects are retained within the guide.

A preferred form of the present invention will now be described by way of example with reference to the accompanying drawings wherein.

Figure 1:
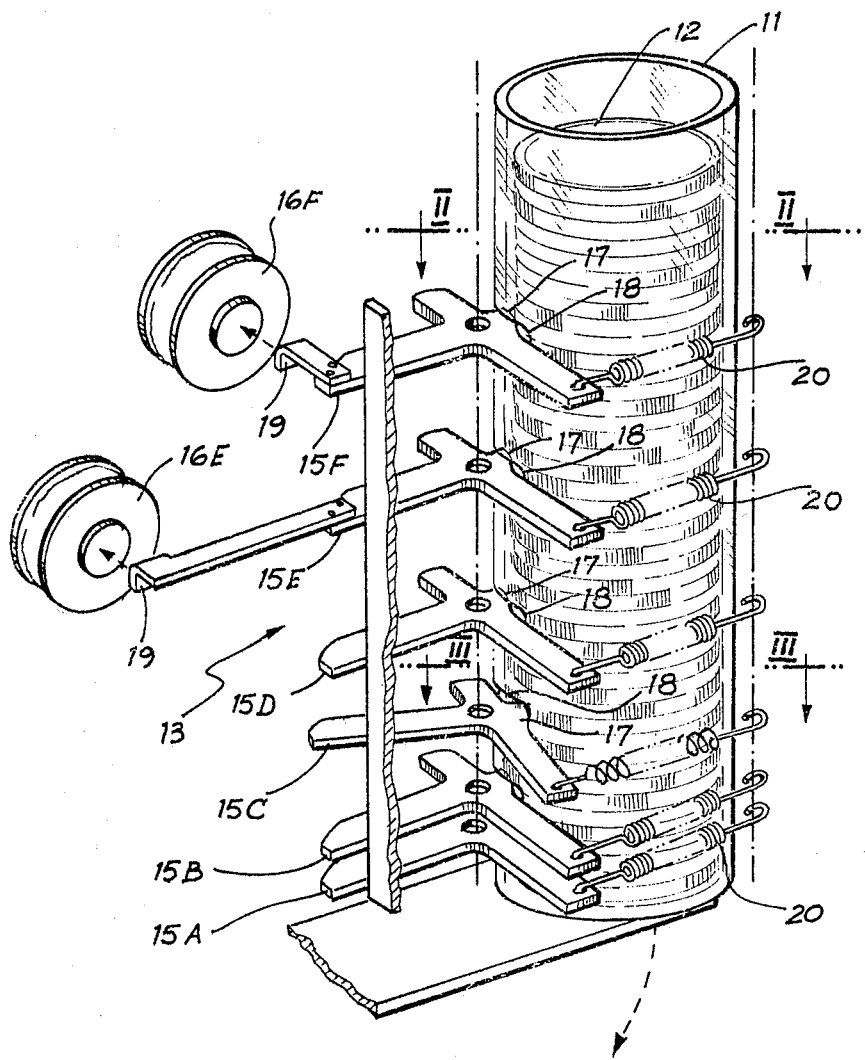
FIG. 1 is a schematic perspective view of a coin reservoir and coin engaging mechanism of a coin dispensing apparatus.
Figures 2, 3:
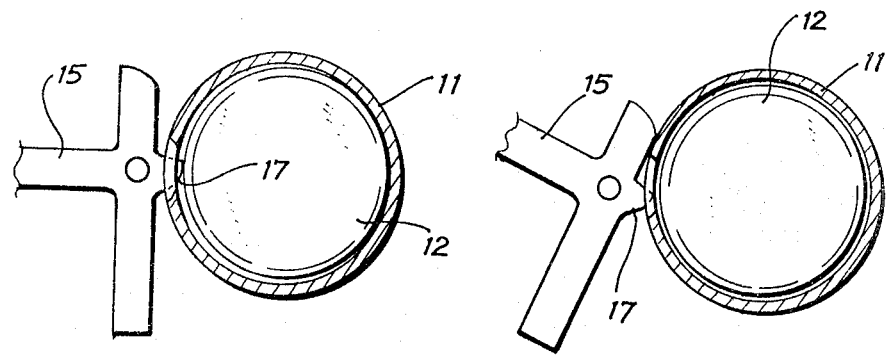
FIGS. 2 and 3 are schematic plan views of a coin engaging member of the coin engaging mechanism of FIG. 1 depicted in a coin engaging and a coin releasing position.
Figure 5:
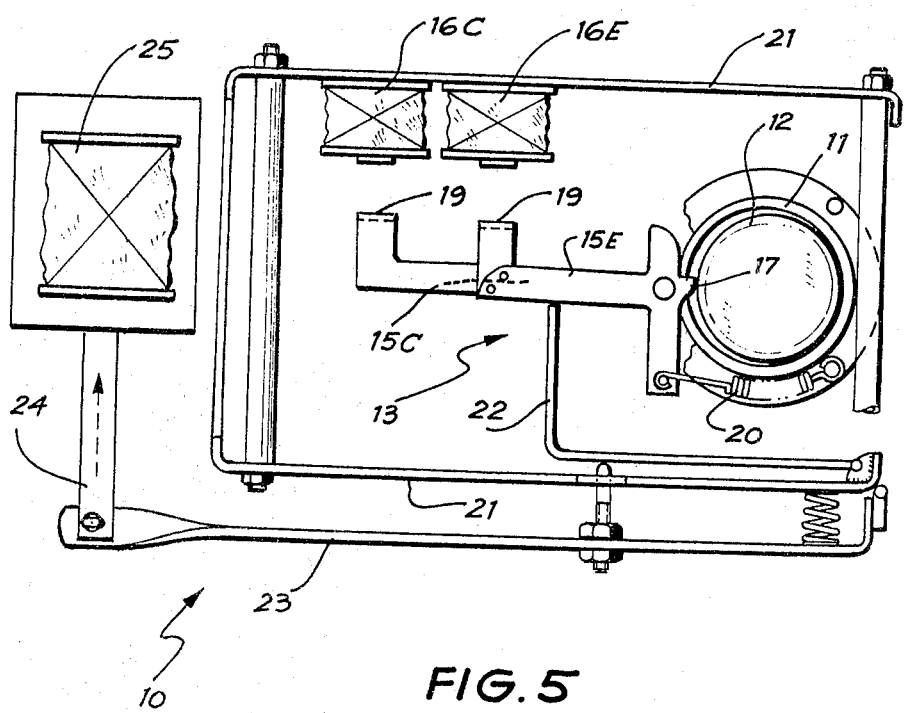
FIG. 5 is a plan view of the dispensing apparatus of FIG. 4.
Figure 4:
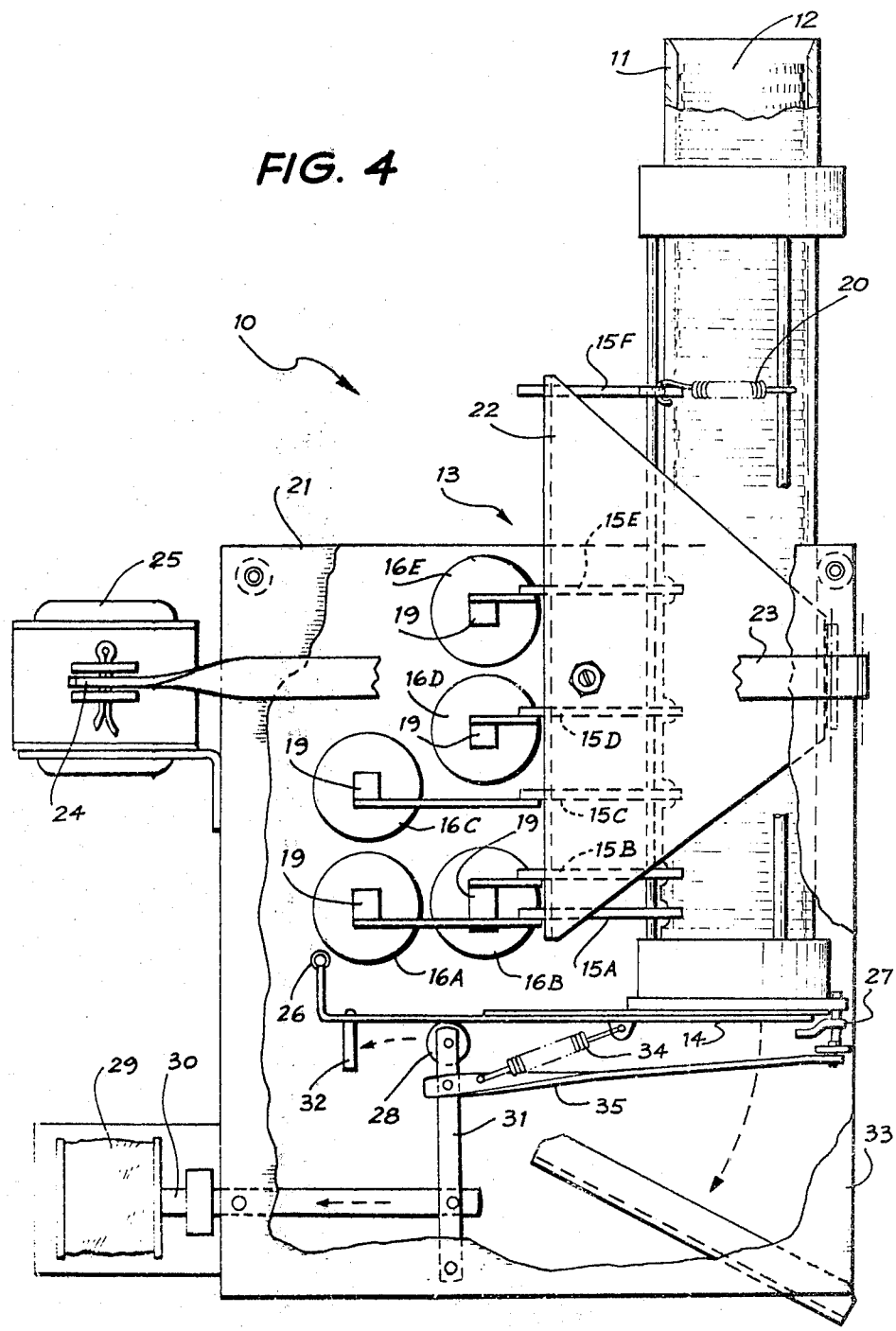
FIG. 4 is an elevation view of a coin dispensing apparatus employing the coin reservoir and coin engaging mechanism of FIG. 1.

The present embodiment will be described when used in conjunction with a slot machine where a variety of pay-outs is possible, therefore the coin dispensing apparatus of the slot machine is adapted to release a predetermined number of coins dependent on the combination displayed by the display wheels. The dispensing apparatus 10 includes a coin reservoir in the form of tube 11 within which is positioned a plurality of coins 12. Positioned adjacent the tube 11 is the coin engaging mechanism 13 which is adapted to engage one or more of the coins 12 to jam the coins in the tube 11 so that the coins below the lowest jammed coin may be released by movement of the chute 14 to open the bottom of the tube. The coin engaging mechanism 13 comprises a plurality of coin engaging members 15 (A to F) and a plurality of solenoids 16 (A to F), not all depicted, the members 15 each have a projection 17 adapted to pass through a corresponding aperture 18 in the tube 11 so as to enable engagement with the side of a coin 12. Each member 15 is further provided with a metal contact portion 19 adapted to engage and to be selectively held by a corresponding one of solenoids 16, and is biased to a coin engagement position by one of springs 20. Thus the number of coins 12 allowed to leave the tube 11 is determined by which the solenoids 16 is activated, that is to say if solenoid 16A is activated the member 15A is held so as not to engage a coin 12 thus allowing the coins 12 below the member 15B to leave the tube 11. The metal portions 19 are moved into engagement with the solenoids 16 by the bar 21 which is pivotally attached to the housing 22 and movable by arm 23. One end of arm 23 is pivotally attached to the housing 22 while the other end is attached to the plunger 24 of the solenoid 25.

Now turning to the area adjacent the bottom of the tube 11, wherein chute 14 is depicted as pivotally attached to the housing 21 by pivot 26. The chute 14 is retained in the depicted position closing the bottom of tube 11 by a catch 27 and roller 28. However by activating solenoid 29 the plunger 30 moves arm 31 which causes roller 28 to engage pin 32 and to rotate catch 27 away from chute 14. As roller 28 presses against pin 32 the chute is pivoted downward to release coins from the tube 11 to allow the coins to leave the dispensing apparatus via opening 33. The arm 31 is biased to the depicted position by spring 34 extending between the lever 35, which moves catch 27, and the housing 21.

In operation the sequence of movements is as follows. Assuming the dispensing apparatus is part of a slot machine then upon the insertion of a coin in the machine, the bar 22 is moved by solenoid 25 to engage the metal contacts 19 with the solenoids 16. Once the indexing apparatus has located the display wheels in predetermined positions and the combination analysed to determine the pay-out, a particular one or more of solenoids 16 are activated. The bar 22 then returns to the depicted position so that those members 15 not held against the solenoids 16 pivot to engage a coin 12 in the tube 11. Next the solenoid 29 is activated and the coins 12 below the lowest member 15 which is in engagement with a coin 12 are allowed to leave the tube 11 by the movement of the chute 14 away from the bottom of the tube 11. When a further coin is inserted in the slot machine and the bar 22 moved by solenoid 25, the coins still remaining in the tube 11 are allowed to move down the tube 11 to be held in position by the chute 14 as all of the members 15 are pivoted to a position so that none of the projections 17 extend into the interior of the tube 11.

It should be appreciated that the above-described embodiment is adaptable to dispense other objects other than coins by alteration of the spacing between the members 15 and the dimensions of the tube 11. Additionally the members 15 are actuable mechanically rather than by a solenoid.

What I claim is:

1. A dispensing apparatus to dispense objects of generally uniform size, said apparatus comprising a generally vertical guide defining a passage to receive and store a plurality of the objects, object engaging means movable between a first position projecting into said passage and a second position not projecting into said passage, said engaging means when in said first position is adapted to engage one of said objects and jam it within said guide to prevent movement of said one of said objects so that lower objects may be dispensed from within said guide while objects located above said one of said objects are retained within the guide, said engaging means including a plurality of pivotally mounted members each having a lobe positionable within said passage by horizontal pivoting movement of the member to said first position, said members being spaced axially along said passage with each of the lobes being adapted to engage a respective one of the objects located in said guide, and selection means adapted to move a predetermined one or more of said members from said first position to said second position to enable a predetermined number of said objects to be dispensed from within said guide.

2. The apparatus of claim 1 further including release means located at the lower end of said guide and adapted to releasibly retain the objects within said guide, and said selection means is adapted to co-ordinate movement of said engaging means and said release means to dispense the objects from within said guide.

3. The device of claim 2 wherein said selection means is adapted to simultaneously move said members to said second position when said release means is in a retaining position to enable movement of said objects toward the lower end of said guide.

4. The apparatus of claim 3 wherein each member is biased to said first position by resilient means, and said selection means includes a plurality of solenoids, and wherein each of said members is adapted to be moved by actuation of a respective one of said solenoids.

* * * * *